Figure 1:
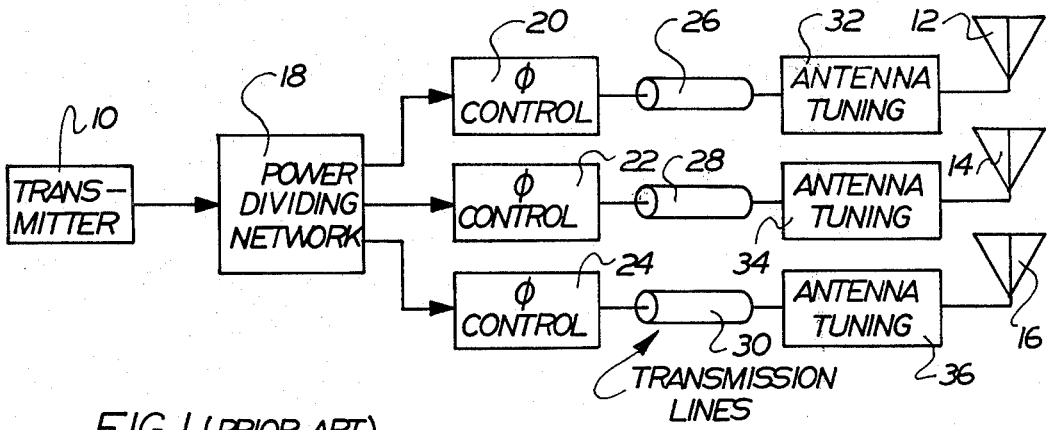
FIG. 1 (PRIOR ART)
Figure 2:
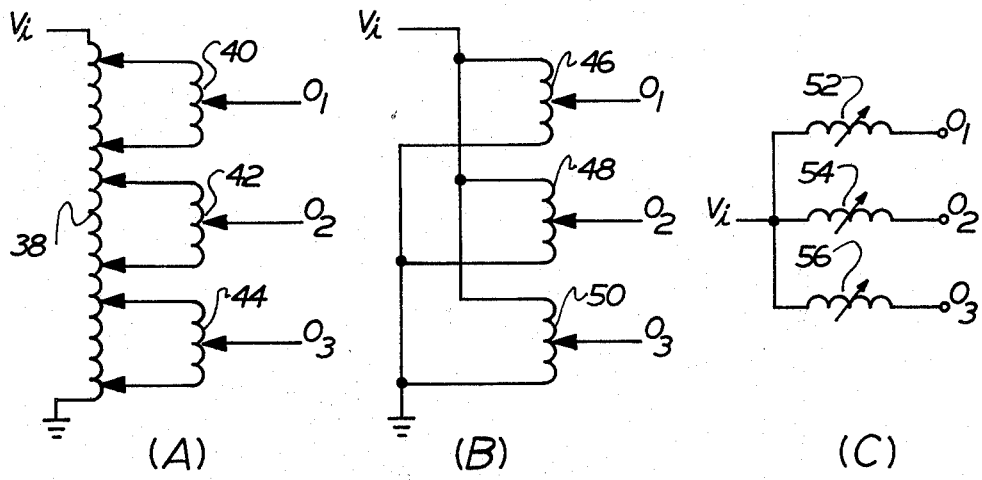
FIG. 2 (PRIOR ART)
Figure 3:
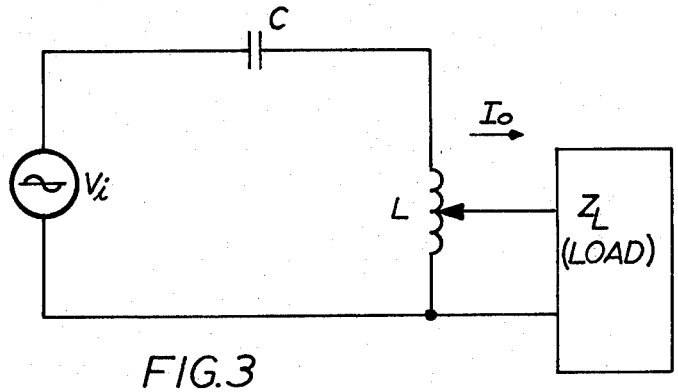
Figure 4:
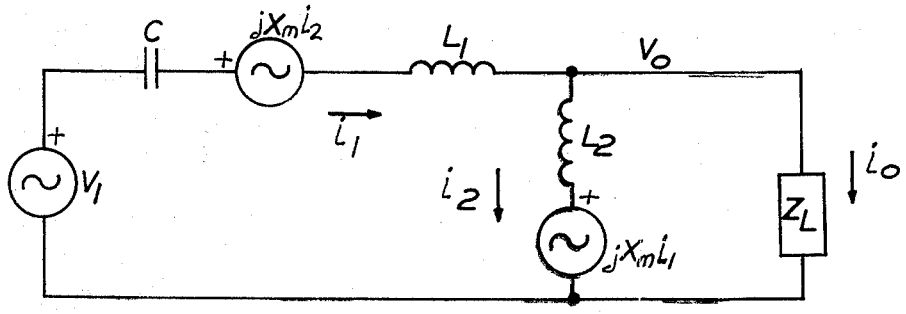
Figure 5:
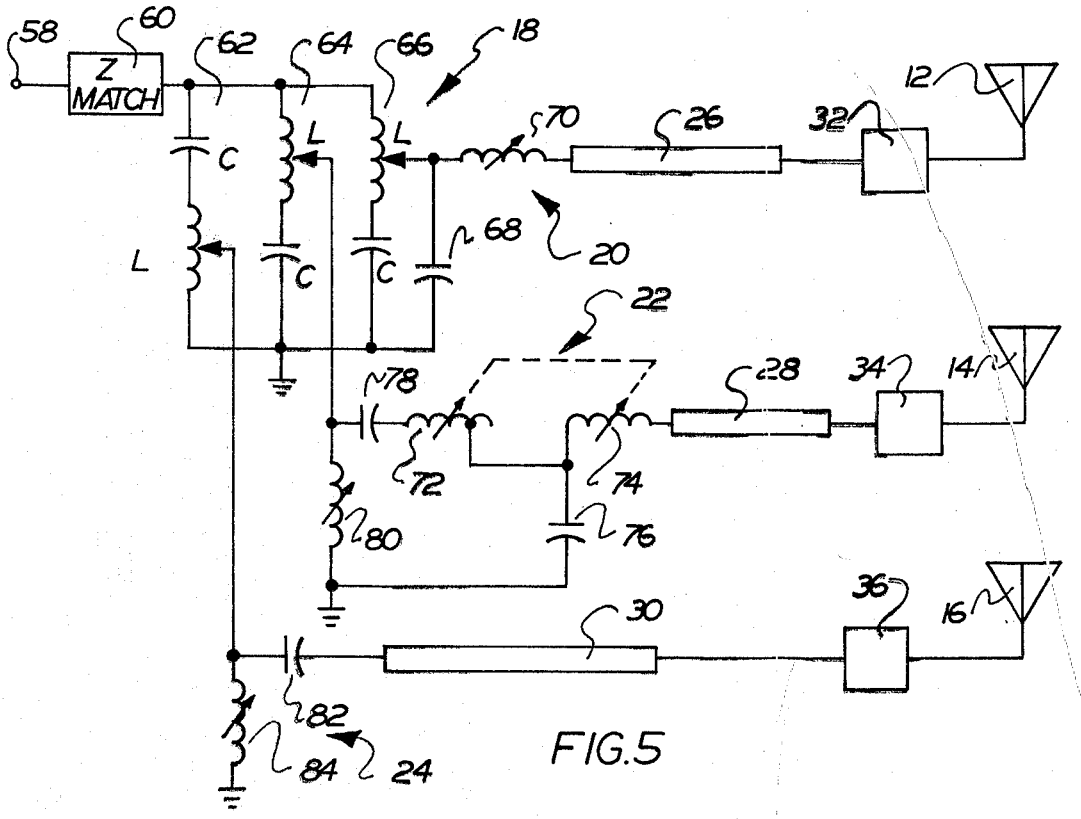
Figure 6:
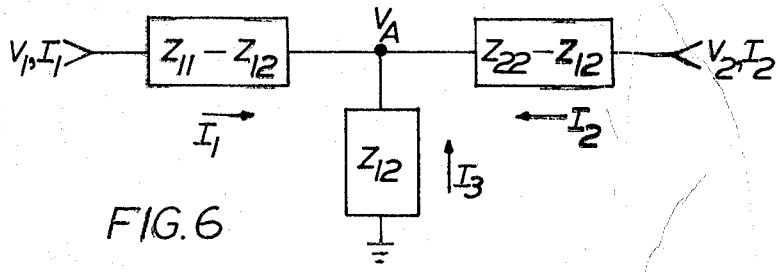
Figure 7:
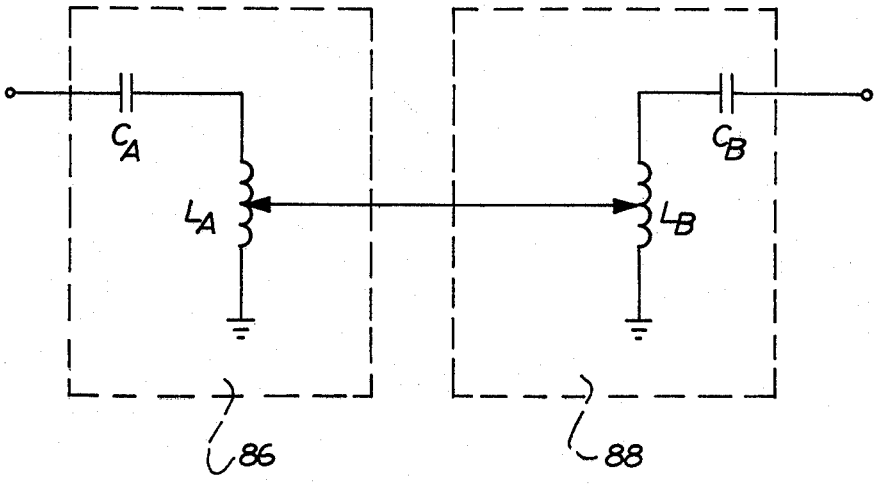

United States Defensive Publication [19] (H) [11] T102,002

Jubera [43] Jul. 6, 1982

[54] PHASE INVARIANT, ADJUSTABLE POWER CONTROLLER

[76] Inventor: Johnny D. Jubera, 3 Curved Creek Rd., Quincy, Ill. 62301

[21] Appl. No.: 255,346

[22] Filed: Apr. 17, 1981

Related U.S. Application Data

[63] Continuation of Ser. No. 63,724, Aug. 6, 1979, abandoned.

[51] Int. Cl.[3] ..... H01Q 3/26

[52] U.S. Cl. ..... 343/854

[57] ABSTRACT

A power controller is disclosed which is adapted to be coupled between a power source and a power sink. The controller is linear, passive, and lossless, and is characterized by an input impedance of zero when the output is open-circuited, and by an adjustable voltage-input/-current-output ratio. One disclosed embodiment is comprised of a series resonant LC Circuit wherein the inductor has an adjustable tap location. The power sink is connected across the tap. Various circuits are also disclosed which are connectable to the output of the power controller for adjusting the phase of the output signal. A power divider system for distributing power from a transmitter to plural broadcasting antennas is shown which utilizes these power controllers and phase adjusters.

8 Claims, 3 Sheets Drawing,

25 Pages Specification

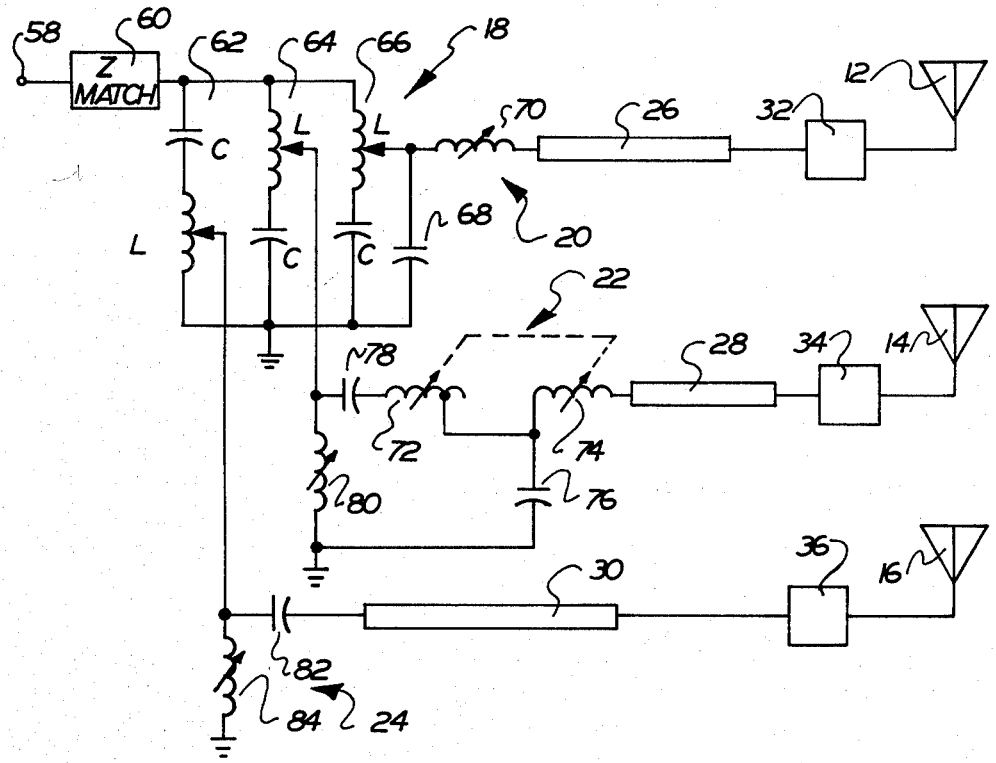

The file of this unexamined application may be inspected and copies thereof may be purchased (849 O.G. 1221, Apr. 9, 1968).